3,076,765
HIGH VISCOSITY FLOTATION AND DAMPING FLUID

Fred W. West, Paterson, Raymond J. Seffl, Bloomfield, and Kenneth J. Reilly, Jersey City, N.J., assignors, by mesne assignments, to Minnesota Mining and Manufacturing Company, St. Paul, Minn., a corporation of Delaware No Drawing. Original application Feb. 15, 1957, Ser. No. 640,305. Divided and this application Dec. 11, 1957, Ser. No. 706,533

4 Claims. (Cl. 252—78)

This invention relates to a high viscosity material and to a method for the preparation thereof. In one aspect, this invention relates to a flotation agent for reducing frictional losses in instruments and machines. Another aspect of this invention relates to a damping agent for reducing impact and vibration damage and offers viscous non-elastic restraint to moving parts within a gyro. Another aspect of this invention relates to a halogenated, highly viscous material having high density and high shear stability. Still another aspect of this invention relates to a perchlorofluorinated damping and flotation agent for gyro mechanisms.

Gyro mechanisms which are used for controlling the operation of rockets, other aircraft and ships have now achieved wide recognition. A present day need for improved operating characteristics of gyros, is a highly viscous, high density material which is stable at high temperatures, that is, at temperatures of about 200° F. Various fluids and waxes have been employed for this purpose but these have not been able to meet all of the requirements demanded for a material of this type. Typical specifications for a gyro fluid are presented in Table I:

TABLE I

| Temperature class | Viscosity, cp. | Density, g./cc. | Cloud point, °F. |
|---|---|---|---|
| 120° F | 3,000 | 1.958 | <115 |
| 140° F | >2,800 | 1.949 | <135 |
| 160° F | 600 | 1.922 | <155 |
| 160° F | 1,000 | 1.928 | <155 |
| 160° F | 2,000 | >1.930 | <155 |

Other instruments such as the bi-metallic dial type thermometers and chemical seal pulsation dampeners have also indicated a need for a highly viscous material which meets most of the specifications mentioned above.

It is, therefore, an object of the present invention to provide a material having a high viscosity, a low clear point and a high density at elevated temperatures and to provide a method for the preparation thereof.

Another object of this invention is to provide a non-corrosive, thermally stable perchlorofluorinated olefin polymer suitable for use as a damping and flotation fluid.

Another object of this invention is to provide a perchlorofluorinated olefin polymer having a maximum clear point not in excess of 155° F.

Another object of this invention is to provide a low molecular weight percholorofluorinated olefin polymer having a density of at least 1.949 grams per cc. at 140° F.

Another object is to provide a low molecular weight perchlorofluorinated olefin polymer having a viscosity of about 2800 cp. or higher at 140° F.

Another object is to provide a low molecular weight perchlorofluorinated olefin polymer suitable for use as a damping and flotation agent in a gyroscope.

Still another object of this invention is to provide a commercially feasible method for the preparation of a perchlorofluorinated olefin polymer damping and flotation agent having the above properties.

According to this invention a low molecular weight chlorotrifluoroethylene polymer having a melting point between about 140° F. and about 250° F. (ball and ring) is dissolved in a solvent, the temperature of the solution is lowered, the insolubles are removed from the solution leaving a filtrate and the soluble polymer product is recovered from the filtrate. The soluble polymer product which is recovered from the filtrate has a cloud point between about 100° F. and about 215° F. and a viscosity in excess of 200 centistokes at 210° F. This soluble wax product may be used directly as, for example, a specification gyro fluid, or it may be blended with a low molecular weight perhalogenated olefin polymer melting between about 90° F. and about 140° F. to obtain a product having the desired viscosity, density, cloud point and other requirements mentioned above.

The low molecular weight polymeric starting material of the present invention is the homopolymer of chlorotrifluoroethylene which melts at a temperature between about 140° F. and about 250° F. and which has the following formula $$Y(CF_2CFCl)_xZ$$

wherein $x$ is an integer between 10 and 100 and Z and Y are selected from the group consisting of the halogens (fluorine, chlorine, bromine and iodine) and a perhalogenated alkyl radical.

The preferred chlorotrifluoroethylene polymer is the telomer of chlorotrifluoroethylene wherein Y and Z are normally gaseous halogen atoms (chlorine and fluorine) such as, for example, the telogen prepared from the reaction of chlorotrifluoroethylene with sulfuryl chloride, which telomer has a melting point between about 200° F. and about 235° F. (ball and ring). The preparation of this telomer is given in U.S. Patent No. 2,770,659.

Other suitable starting materials include the telomers of chlorotrifluoroethylene with halogens and aliphatic perhaloalkyl carbon compounds containing between 1 and 4 carbon atoms for example, fluorine, chlorine, bromine, iodine, bromochlorodifluoromethane, bromotrifluoromethane, chlorotrifluoromethane, bromotrichloromethane, trichlorotrifluoroethane, pentachlorotrifluoropropane, etc. These telomers are prepared by cotelomerizing chlorotrifluoroethylene and the corresponding telogen in the presence of a peroxy compound. More specific details of the preparations are found in copending applications of William S. Barnhart, Serial No. 347,186 (filed April 6, 1953, now Patent No. 2,875,253) and Serial No. 452,708 (filed August 27, 1954, and now abandoned).

In the process of this invention the chlorotrifluoroethylene polymer is dissolved in a suitable solvent such as an aliphatic alcohol, ketone, ether, ester or halocarbon or an aromatic alcohol, ketone, ether, ester or hydrocarbon. Examples of suitable solvents used in this invention include Cellosolve, dioxane, methyl phenyl ether, ethyl ether, ethyl phenyl ether, acetone, methyl ethyl ketone, acetophenone, isopropyl alcohol, diacetone alcohol, mineral spirits, methyl alcohol, benzyl alcohol, ethyl alcohol, ethyl acetate, methyl propionate, ethyl benzoate, carbon tetrachloride, trichloroethylene, chloroform, the Freons, toluene, xylene, etc., and mixtures of these solvents. The polychlorotrifluoroethylene is melted before it is admixed with the solvent.

Solvent to polymer ratios employed in this process can be varied between about 0.5:1 and about 20:1, preferably between about 1:1 and about 15:1. The chlorotrifluoroethylene polymer is generally dissolved at an elevated temperature such as for example, in a solvent which is maintained at a temperature of between about 100° F. and about 305° F. or at about the reflux temperature of the solvent. However, it is also within the scope of this invention to dissolve the polymer or fraction thereof in a solvent at room temperature (75° F.). The preferred method comprises dissolving the polymer in the solvent at a temperature of about 10° below the reflux temperature of the solvent but not at a temperature in excess of 305° F. While the polymer is being admixed with the solvent, it is generally preferred to agitate the mixture for a period of between about 10 minutes to about 10 hours. In most cases the mixture is agitated for a period not exceeding 2 hours. After the polymer is mixed with the solvent for the desired period of time, some insoluble material may still be present. These insolubles may be removed immediately if so desired.

The temperature of the solution of polymeric material prepared above at an elevated temperature is then lowered, preferably by allowing it to cool to about room temperature. However, in cases where the solution has been prepared at room temperature, the solution temperature is lowered for example, by a cold bath or by refrigeration usually to a temperature not below −10° C. and preferably not below 10° C. The lowering of the solution temperature results in the precipitation of insoluble materials. The insoluble material is removed as a residue by filtration, decantation or by any other convenient process or any combination of the above processes and the desirable polymer fraction or product which remains in the filtrate is recovered by evaporating, flashing off, fractionating, or distilling off the solvent or by the addition of water, if a water-soluble solvent is employed. The water takes up the solvent and can be decanted leaving a soluble polymer product, more specifically, a soluble wax product as the crude product of this invention. The crude soluble wax production is then dried.

When the desired wax product is recovered by the addition of water to the filtrate, the volume of water added to the filtrate can vary between about 0.05 and about 2 volumes or more, preferably between about 0.25 and about 1 volume of water per volume of filtrate. The soluble wax product so obtained is then dried to produce a wax product having a cloud point between about 100° F. and about 215° F. and a viscosity in excess of 200 centistokes at 210° F. If desired, the insoluble material which is removed after the solution temperature has been lowered can be reprocessed by redissolving it in a solvent; cooling the resulting solution; removing the insoluble materials and adding the resulting filtrate containing crude soluble wax product to the first filtrate before removing the solvent.

In one embodiment of the invention, the process is carried out by dissolving a liquid telomer of chlorotrifluoroethylene, melting between about 200° F. and about 235° F. in an aliphatic water-soluble solvent at the reflux temperature of the solvent, or at a temperature 5° or 10° below the reflux temperature of the solvent employed. The solution is agitated at this temperature for a period of not more than 2 hours and then allowed to cool to room temperature. The resulting insoluble material, which is precipitated, is removed from the filtrate and water is added with agitation to the filtrate in a volume of between about 0.25 and about 1 volume of water for each volume of filtrate. After thoroughly mixing, the solid or crude product is allowed to settle, the liquors are removed and the remaining solvent is pressed from the soluble wax product so formed. The soluble wax product is then dried at a temperature between about 150° F. to about 250° F. for a period of from about 1 to about 16 hours under a pressure not in excess of about 300 mm. Hg, preferably not in excess of 175 mm. Hg.

In a preferred embodiment of the present invention the liquid telomer of chlorotrifluoroethylene obtained by melting the telomer is dissolved in a suitable solvent such as, for example, a toluene-isopropyl alcohol mixture, at an elevated temperature such as, for example at about 170° F. The solution is agitated for a period of not more than 2 hours and allowed to cool to room temperature. The resulting insoluble material, which precipitates, is removed from the filtrate and the soluble wax product is completely removed from the filtrate by distilling off the solvent.

The soluble wax product of this process, which has a cloud point between about 100° F. and about 215° F., a density between about 1.905 and about 1.930 at 210° F. and a viscosity between about 205 and about 700 centistokes at 210° F., is suitable for direct use as a flotation or damping agent or it can be blended with a lower molecular weight perhalogenated wax, such as polychlorotrifluoroethylene wax having a melting point between 90° F. and about 140° F. in amounts which vary from 100 weight percent to about 20 weight percent of the soluble wax product obtained above, preferably between about 40 weight percent to about 65 weight percent of soluble wax product obtained above. When the soluble wax product has a cloud point of 135° F. or above, it is usually desirable, in applications for gyro fluids, to blend the extracted wax products with a lower melting perhalogenated wax, melting between about 90° F. and about 140° F. for example, a polychlorotrifluoroethylene wax such as Kel-F 40 wax. The preparation of these low molecular weight, low melting polychlorotrifluoroethylene waxes is given in U.S. Patent No. 2,770,659.

The following examples are offered as a better understanding of the present invention and are not to be construed as unnecessarily limiting thereto.

The following example in Table II illustrates the preparation of the final extracted wax product of this invention. In the following example Kel-F 200 wax (the telomer of chlorotrifluoroethylene with sulfuryl chloride having a melting point from 200° F. to 235° F.) was dissolved in a water-soluble solvent at 175° F. Upon cooling the solution to room temperature the insoluble material was removed as a residue and the wax which remained in the filtrate was labeled Soluble Wax #1. The residue was dissolved in the same solvent at 175° F., the resulting solution was then allowed to cool to room temperature and the insoluble material was removed as the residue. The wax which remained in the filtrate was labeled Soluble Wax #2. The first and second filtrates are usually combined before removal of the solvent to obtain the soluble wax product, however, in the following example the two soluble wax products, which were separated from the filtrate by the addition of water, by decantation of the supernate and drying the product, were treated separately for comparison purposes.

TABLE II
*Solvent Extraction of Kel-F 200 Wax*

| Ex. No. | Amount of Kel-F 200 Wax, g. | Solvent | Volume ratio solvent:wax | Components of Kel-F 200 Wax | Isolated yield, percent | Dynamic cloud point, °F. | Viscosity, cs./°F. |
|---|---|---|---|---|---|---|---|
| 1 | 1,000 | Isopropyl alcohol | 10:1 | 1st soluble wax | 35.8 | 152 | 323.2/210 |
|   |       |                   |      | 2nd soluble wax | 8.3  | 184 | 486.5/210 |
|   |       |                   |      | Residue         | 46.2 |     |           |

The cloud point was determined by slowly cooling a 15 gram sample of the final extracted wax product in a 25 x 150 mm. glass tube. All cloud points determined on waxes subsequently described were also carried out in this way.

preparation of the soluble wax product when reprocessing the residue is omitted and compares the properties of the product with the residue. In all the examples in Table III the soluble wax product was removed from the filtrate by distilling off the solvent.

TABLE III

| Ex. No. | Amount of Kel-F 200 Wax, grams | Solvent | Volume ratio, solvent:wax | Components of Kel-F 200 Wax | Yield, percent | Cloud point, °F. | Viscosity, cs./°F. | Density, g./cc. at 210°F. | Density, g./cc. at 140°F. |
|---|---|---|---|---|---|---|---|---|---|
| 2 | 467 | Isopropanol | 2:1 | Soluble wax product | 13.0 | 118 | 209.3/210 |  |  |
|   |     |             |     | Residue             | 85.0 | 219 |           |  |  |
| 3 | 454 | ...do...    | 5:1 | Soluble wax product | 27.4 | 134 | 252.9/210 | 1.9128 |  |
|   |     |             |     | Residue             | 71.2 | 226 |           |        |  |
| 4 | 469 | Acetone     | 2:1 | Soluble wax product | 48.8 | 156 | 401.9/210 | 1.9173 |  |
|   |     |             |     | Residue             | 45.2 | 244 |           |        |  |
| 5 | 456 | ...do...    | 5:1 | Soluble wax product | 65.1 | 169 | 415.0/210 |        |  |
|   |     |             |     | Residue             | 26.1 | 270 |           |        |  |
| 6 | 250 | Isopropanol | 10:1 | Soluble wax product | 39.5 | 139 | [1] 277/210 | 1.912 | 1.9705 |
|   |     |             |      | Residue             | 54.9 | 230 |             |       |        |
| 7 | 250 | ...do...    | 15:1 | Soluble wax product | 45.7 | 150 | 299/210     |       |        |
|   |     |             |      | Residue             | 48.4 | 230 |             |       |        |

[1] Calculated to be 12,000 cp. at 140°F. or 6,500 cs. at 140°F.

For comparison purposes, Kel-F 200 wax was tested and had a cloud point of 216°F.; a viscosity of 132.6 centistokes at 266°F. and a viscosity of about 950 centistokes at 210°F. Kel-F 40 wax (polychlorotrifluoroethylene wax having a melting point between about 90°F. and about 140°F.) was also tested and found to have a cloud point of 96°F., a viscosity of 37.97 centistokes at 210°F. and a density of 1.8792 at 210°F. Although according to gyro specifications the cloud point of Kel-F 40 wax is good, the viscosity and density is so poor that it would be unsuitable as a damping and flotation fluid for gyro mechanisms. As shown above, Kel-F 200 wax is deficient as a gyro fluid both in cloud point and in viscosity requirements.

The following examples in Table III illustrate the

The examples in Table IV below show additional experiments on the preparation of the soluble wax product using different solvents from those used in Table III. In the following examples (#8 through #23) the soluble wax product was separated from the filtrate by distillation. In Example #24 the soluble wax product was recovered by addition of water, decantation of the supernate and subsequent drying of the soluble wax product.

TABLE IV

| Ex. No. | Amount of Kel-F 200 Wax in grams | Solvent | Volume ratio, solvent:wax | Yield of soluble wax, percent | Cloud point, °F. | Viscosity 210°F. | Viscosity 160°F. | Viscosity 140°F. | Density, g./cc. 210°F. | Density, g./cc. 160°F. | Density, g./cc. 140°F. |
|---|---|---|---|---|---|---|---|---|---|---|---|
| 8  | 200 | Diacetone alcohol | 5:1 | 25.9 | 130-35 |  |  |  |  |  |  |
| 9  | 200 | Cellosolve | 5:1 | 31.4 | 185-90 |  |  |  |  |  |  |
| 10 | 200 | Methyl ethyl ketone | 5:1 | 81.8 | 165-70 |  |  |  |  |  |  |
| 11 | 200 | Dioxane | 5:1 | 60.4 | 160-65 |  |  |  |  |  |  |
| 12 | 200 | Mineral spirits | 5:1 | 51.5 | 185-90 | 709.7 cs. |  |  |  |  |  |
| 13 | 200 | Toluene | 5:1 | 80.3 | 215-20 |  |  |  | 1.914 |  |  |
| 14 | 200 | Trichloroethylene | 1:1 | 91.9 | 180-85 | 581 cs. |  |  | 1.908 |  |  |
| 15 | 200 | Toluene | 2:1 | 68.9 | 185-90 | 538 cs. |  |  | 1.932 |  |  |
| 16 | 200 | ...do... | 4:1 | 79.0 | 182-85 | 633 cs. |  |  | 1.915 |  |  |
| 17 | 200 | ...do... | 5:1 | 90.3 | 185-90 | 549 cs. |  |  | 1.9185 | 1.957 |  |
| 18 | 200 | ...do... | 5:1 | 92.5 | 145-50 | 343 cs. | 5,500 cp. |  | 1.9185 |  |  |
| 19 | 200 | 20% toluene in i-PrOH | 5:1 | 47.3 | 155-60 | 399 cs. |  |  | 1.9187 |  |  |
| 20 | 200 | 33⅓% toluene in i-PrOH | 5:1 | 63.7 | 160-65 | 445 cs. |  |  | 1.9241 |  |  |
| 21 | 200 | 40% toluene in i-PrOH | 5:2 | 70.3 | 170-75 | 531 cs. or (1,014.8 cp.) |  |  |  |  |  |
| 22 | 200 | 50% toluene in i-PrOH | 5:1 | 81.8 | 145-50 | 331.7 cs. | 2,518.4 cs. or (4,918.3 cp.) |  |  | 1.9529 |  |
| 23 | 200 | 20% toluene in i-PrOH | 5:1 | 47.6 | 137 | 278 |  |  |  |  |  |
| 24 [1] | 200 | Isopropanol | 10:1 | 35.9 |  |  |  |  |  |  |  |

[1] The soluble wax product was recovered by the addition of water, decantation and drying of the wax product.

Examples #25 through #44 in Table V below give the amount of material employed in the preparation of wax blends having the desired properties of the present invention. The extracted wax product was obtained from Kel-F 200 wax as described in the previous examples which employed a single extraction of the Kel-F 200 wax in solution.

TABLE V

| Ex. No. | Soluble wax product obtained from example | Soluble wax product, grams | Kel-F 40 wax, grams | Cloud point, °F. | Viscosity, cs. | | Density, g./cc. | | | Viscosity, cp. | | | Viscosity cp./°F. |
|---|---|---|---|---|---|---|---|---|---|---|---|---|---|
| | | | | | 140° F. | 210° F. | 140° F. | 160° F. | 210° F. | 140° F. | 160° F. | 210° F. | |
| 25 | 4 | 46.8 | 53.2 | 115-20 | 1,619 | | 1.9520 | | | 3,160 | | | |
| 26 | 5 | 46.4 | 53.6 | 120-25 | 1,647 | 109.3 | 1.9560 | | | 3,220 | | | |
| 27 | 2 | 61.1 | 38.9 | 100-05 | 1,707 | 112 | 1.9545 | | | 3,340 | | | |
| 28 | 3 | 56.0 | 44.0 | 110-15 | 1,507 | 114.3 | 1.9501 | | 1.8989 | 2,940 | | | |
| 29 | 7 | 52.1 | 47.9 | 115-20 | 1,638 | 105 | 1.9521 | | 1.8956 | 3,190 | | | |
| 30 | 24 | 50.8 | 49.2 | 115-20 | 1,630 | | 1.9523 | | | 3,180 | | | |
| 31 | 22 | 42.2 | 34.8 | 115-20 | 1,603.2 | | 1.9522 | ¹1.934 | ¹1.8931 | 3,065 | ¹1,100 | ¹189 | |
| 32 | 6 | 53.8 | 46.2 | 110-15 | 1,615 | ¹104 | 1.9514 | | ¹1.894 | 3,150 | | | |
| 33 | 6 | 57.2 | 42.8 | 115-20 | ¹1,700 | ¹112 | ¹1.954 | | ¹1.895 | | | | ¹12,500/115 |
| 34 | 6 | 66.6 | 33.4 | 120-25 | ¹2,400 | ¹135 | ¹1.957 | | ¹1.899 | | | | ¹10,500/120 |
| 35 | 6 | 80 | 20 | 125-30 | ¹3,700 | ¹175 | ¹1.962 | | ¹1.904 | | | | ¹11,500/120 |
| 36 | 6 | 90 | 10 | >135 | ¹5,000 | ¹220 | ¹1.966 | | ¹1.908 | | | | ¹1,400/130 |
| 37 | 13 | 37.5 | 62.5 | 130-35 | 1,554 | | 1.9500 | | | 9,800 | | | |
| 38 | 19 | 80 | 20 | 130-35 | | | ¹1.9620 | ¹1.946 | ¹1.9068 | 3,085 | | | |
| 39 | 19 | 70 | 30 | 125-30 | | | ¹1.9570 | ¹1.9415 | ¹1.9025 | ¹8,500 | ¹3,000 | ¹400 | |
| 40 | 19 | 60 | 40 | 120-25 | | | ¹1.9530 | ¹1.9375 | ¹1.8982 | ¹6,500 | ¹2,300 | ¹314 | |
| 41 | 23 | 80 | 20 | 130-35 | 3,726.5 | | | | | ¹4,500 | ¹1,650 | ¹248 | |
| 42 | 22 | 80 | 20 | 150-55 | | | | | | 7,280 | | | |
| 43 | 22 | 70 | 30 | 140-45 | | | ¹1.963 | ¹1.952 | ¹1.9125 | ¹8,500 | ¹4,000 | ¹545 | |
| 44 | 22 | 60 | 40 | 135-40 | | | ¹1.957 | ¹1.947 | ¹1.9075 | ¹6,200 | ¹3,000 | ¹410 | |
| | | | | | | | | ¹1.941 | ¹1.9015 | | ¹2,250 | ¹310 | |

¹ Calculated values.

It is to be understood without departing from the scope of this invention that any of the other polychlorotrifluoroethylene waxes melting between about 140° F. and about 250° F. (ball and ring), particularly polychlorotrifluoroethylene wax melting between about 140° F. and about 160° F. (Kel-F 10—200 Wax) can be extracted in accordance with the procedure set forth in any of the above examples to produce a wax product having the above described valuable properties; and that the wax products so produced can be employed per se or they can be blended with any of the perhalogenated waxes which melt between about 90° F. and about 140° F.

The products of this invention are particularly suited for use as damping and flotation fluids in gyro mechanisms since they meet all of the rigid requirements for gyro fluids. However, in addition to this application, the products of this invention may also be employed as damping fluids or flotation fluids in other applications such as, for example, chemical seal pulsation dampers, bi-metallic dial type thermometers, and other applications which reqirue a highly viscous material which remains clear at low temperatures.

The extracted wax products or their blends may also be used as protective waxes for surfaces subject to corrosion, as packing material around pipe joints, etc. Many other applications of these products will be apparent to those skilled in the art from the accompanying description and properties of these materials.

This invention relates to the extraction and isolation of a soluble wax product from a mixture of a polychlorotrifluoroethylene wax (having a meltting point between about 140° F. and about 250° F.) and an organic solvent for use in a particular application such as, for example, as a gyro fluid. The invention also relates to the mixing of the soluble wax product with a lower melting polychlorotrifluoroethylene oil (having a melting point between about 90° F. and about 140° F.) for use in a particular application such as, for example, as a gyro fluid.

This application is a division of copending United States patent application Serial No. 640,305, filed February 15, 1957.

Having thus described our invention we claim:

1. A damping and flotation fluid for gyro mechanisms and the like having a high viscosity, low clear point and a high density which comprises a homogeneous mixture of (a) between about 5 and about 80 weight percent of a polychlorotrifluoroethylene wax having a melting point between about 90° F. and about 140° F., and (b) between about 95 and about 20 weight percent of a soluble polychlorotrifluoroethylene wax having a cloud point between about 135° F. and about 215° F. and a viscosity between about 205 and about 700 centistokes at 210° F., said soluble polychlorotrifluoroethylene wax being prepared by (1) dissolving a liquid chlorotrifluoroethylene polymer melting between about 140° F. and about 250° F. in an organic solvent selected from the group consisting of alcohols, ketones, ethers, esters, aliphatic halocarbons and aromatic hydrocarbons maintained at a temperature not in excess of 315° F., (2) lowering the temperature of the resulting solution to about room temperature to form a residue and a filtrate, (3) separating the residue from the filtrate and (4) removing the solvent from the filtrate to recover a soluble polychlorotrifluoroethylene wax product.

2. The damping and flotation fluid of claim 1 in which the preparation of said soluble polychlorotrifluoroethylene includes isopropanol as said organic solvent.

3. The damping and flotation fluid of claim 1 in which the preparation of said soluble polychlorotrifluoroethylene includes acetone as said organic solvent.

4. The damping and flotation fluid of claim 1 in which the preparation of said soluble polychlorotrifluoroethylene includes toluene as said organic solvent.

References Cited in the file of this patent

UNITED STATES PATENTS

| | | |
|---|---|---|
| 2,700,661 | Miller | Jan. 25, 1955 |
| 2,770,659 | Barnhart | Nov. 13, 1956 |
| 2,786,827 | Barnhart | Mar. 26, 1957 |
| 2,806,866 | Barnhart | Sept. 17, 1957 |
| 2,837,580 | Barnhart | June 3, 1958 |

OTHER REFERENCES

"Kel-F" Technical Bull. No. 5-1-52 (4 pages), Chemical Manuf. Div., The M. W. Kellogg Co., Jersey City, N.J., May 1, 1952.

Zimmerman et al.: "Handbook of Material Trade Names," Supplement I, October 1956; Industrial Research Service Inc., Dover, N.H., page 117.

UNITED STATES PATENT OFFICE
CERTIFICATE OF CORRECTION

Patent No. 3,076,765            February 5, 1963

Fred W. West et al.

It is hereby certified that error appears in the above numbered patent requiring correction and that the said Letters Patent should read as corrected below.

Columns 5 and 6, TABLE IV, Ex. No. 21, under the heading "Volume ratio, solvent: wax" for "5:2" read -- 5:1 --.

Signed and sealed this 17th day of September 1963.

(SEAL)
Attest:

ERNEST W. SWIDER
Attesting Officer

DAVID L. LADD
Commissioner of Patents